United States Patent
Bonnier et al.

(10) Patent No.: US 8,200,739 B2
(45) Date of Patent: Jun. 12, 2012

(54) ARRANGEMENT AND METHOD RELATING TO LOAD DISTRIBUTION

(75) Inventors: Staffan Bonnier, Askim (SE); Hans Ronneke, Kungsbacka (SE); Anders Freden, Kullavik (SE); Staffan Winell, Askim (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 498 days.

(21) Appl. No.: 11/993,713

(22) PCT Filed: Jun. 23, 2005

(86) PCT No.: PCT/EP2005/006813
§ 371 (c)(1),
(2), (4) Date: Jan. 6, 2010

(87) PCT Pub. No.: WO2006/136193
PCT Pub. Date: Dec. 28, 2006

(65) Prior Publication Data
US 2011/0138046 A1    Jun. 9, 2011

(51) Int. Cl.
*G06F 15/16* (2006.01)
(52) U.S. Cl. .................. 709/201; 709/203; 709/206
(58) Field of Classification Search .......... 709/201, 709/203, 206; 370/353, 355
See application file for complete search history.

(56) References Cited

U.S. PATENT DOCUMENTS

| | | | |
|---|---|---|---|
| 5,774,668 A * | 6/1998 | Choquier et al. | 709/223 |
| 5,951,694 A * | 9/1999 | Choquier et al. | 714/15 |
| 6,772,224 B2 * | 8/2004 | Kung et al. | 709/238 |
| 6,990,667 B2 * | 1/2006 | Ulrich et al. | 718/105 |
| 7,649,901 B2 * | 1/2010 | Musoll et al. | 370/412 |
| 7,876,680 B2 * | 1/2011 | Kadambi et al. | 370/231 |
| 2005/0125798 A1 * | 6/2005 | Peterson | 718/105 |

FOREIGN PATENT DOCUMENTS
EP      0865180 A    9/1998
* cited by examiner

*Primary Examiner* — Phuoc Nguyen
(74) *Attorney, Agent, or Firm* — Roger S. Burleigh

(57) ABSTRACT

A method in a server for controlling the distribution of messages from a plurality of clients among a plurality of processing means, including the steps of: establishing whether a message received on an interface board of the server is addressed using a normal identity specific for the client that sent the message and, if yes, then: using a first algorithm to map the normal identity to a load index in a first mapping means; and, mapping the load index to one of the plurality of processing means using a mapping table provided in the interface board. If the message is addressed using an internal identity generated in the server, rather than the normal identity specific for the client that sent the message, then: using a second algorithm to map the internal identity to a load index in a second mapping means; and, mapping the load index to one of the plurality of processing means using the mapping table provided in the interface board.

4 Claims, 11 Drawing Sheets

ARRANGEMENT AND METHOD RELATING TO LOAD DISTRIBUTION

FIELD OF THE INVENTION

The present invention relates to an arrangement which is adapted to be provided in a server node for example in a telecommunication or a data communication system handling a large number of client or subscribers, comprising a number of interface boards handling one or more protocols, for communication with different nodes, node types and clients, and a number of processing means adapted to serve a plurality of clients or subscribers using a number of different types of identities when addressing the node. The identities or types of identities that are used when addressing the server node are particularly determined by the specific protocols. The invention relates to such an arrangement when clients or subscribers are handled generally for more than a single transaction.

The invention also relates to a method for controlling the distribution of clients or subscribers communicating with a server node comprising a plurality of processing means, in for example a data communication system or a telecommunication system. The invention also relates to a server node comprising such an arrangement.

STATE OF THE ART

Telecommunication networks as well as data communication networks comprise a number of different server nodes each of which normally serve a very large number of clients or subscribers. Such server nodes generally interact with a plurality of different types of other nodes such as for example subscriber databases, service control nodes, gateways towards external networks etc. All these other types of nodes require communication over special types of physical interfaces which use special types of communication protocols. Messages received from such other nodes typically are addressed using various different identities which may serve as the identity of one and the same client or subscriber, i.e. how the subscriber or the client is identified, may depend on over which node or which node type communication takes place with a particular server node.

Due to the fact that a server node generally handles a very large number of subscribers or clients, it comprises a number of different processing means, e.g. processors such as CPUs etc, it is of utmost importance, i.e. it is crucial to the system, that such server nodes can remain in service, i.e. function, also when there are software or hardware failures. In order to achieve scalability while still maintaining proper fault encapsulation, it is attractive, or known, to base the system architecture of such server nodes on an extendible set of loosely coupled processing means.

Preferably the clients or subscribers should then be distributed as evenly as possible over the available processing means in the server node. However, for the first it is difficult to provide an even distribution of the load, i.e. of subscribers or clients, among the available processors. Second, it is very problematic to handle the situation in case of software or hardware failure and for example take care of the situation when one or more processors goes down etc, but also when an "up-scaling" is needed, i.e. addition of one or more further processors. This particularly gets complicated due to the fact that addressing and distribution to processing means gets so complicated, particularly since one and the same client or subscriber may be identified using different types of identities.

In one simple implementation of a load distribution scheme wherein the clients are distributed more or less evenly over the available processors, a solution may be provided which either is non-redundant or which is not scalable. One of the reasons therefor is that, as referred to above, incoming messages from external nodes concerning a particular subscriber or client have to be routed to the correct processing means that handles that subscriber or client. Hence, at the point where the messages are decoded in the sense that an identity is extracted which identifies the client, there must be some way to map the extracted identity to the appropriate processor. This could be done by maintaining the mapping between identity and processing means in a table that is maintained in a node.

This will however lead to a single point of failure and a bottleneck, which means a non-redundant solution, or the mapping has to be replicated. However, if the mapping has to be replicated, replication or replicas have to be synchronized every time an identity is added for a client. It is not feasible to provide for updating and redundancy each time there is a new subscriber identity, particularly if the number of clients or subscribers is very high. On the other hand, if there is only one table and if there is a failure, all information will be lost. It is obvious that serious problems are associated with the handling of a large number of subscribers or clients, for example even up to a million subscribers in one single server node comprising a number of processing means. However, also with a considerably lower number of subscribers, the situation is problematic and so far there has been no satisfactory solution to the above mentioned problems.

SUMMARY OF THE INVENTION

What is needed is therefore an arrangement for distributing clients or subscribers as initially referred to which enables scalability. Further an arrangement is needed through which redundancy can be provided for. Still further an arrangement is needed which is fault tolerant and which efficiently can handle situations when one or more processors disappear or appear. Still further an arrangement is needed through which it is possible to distribute load, i.e. clients or subscribers, evenly among the available processing arrangements in server node. Particularly an arrangement is needed through which subscribers or clients can be distributed in a desired manner among processing arrangements, or in a way which is appropriate with respect to the current number of available processing means.

Still further an arrangement is needed which is robust to hardware failures. Most particularly an arrangement is needed through which clients or subscribers can be routed to the correct processor or processing means handling the client or subscriber, irrespectively of which is the protocol the subscriber or client is communicating over and independently of which identity, which, particularly may be protocol specific, that currently is used such that the subscriber or client always will always be handled or directed to one and the same processor or redistributed due to the current load situation or for reasons of a software failure in the node.

Particularly an arrangement is needed through which routing to the appropriate processing means, irrespectively of the actual identity used to identity a subscriber or client, can be done without the use of a table mapping each identity to a processing means. In addition thereto an arrangement is needed through which subscribers or clients can be routed or handled by the appropriate processing arrangement even if the clients or subscribers are addressing the node over different protocols which hence can be addressed using different types of identity for one and the same subscriber. Particularly an arrangement is needed through which clients simply can be identified irrespectively of which type of identity that is used. Even more particularly an arrangement is needed which functions in a distributed execution environment despite individual processing means or interface units being temporarily or permanently lost and irrespectively of whether there is a very large number of subscribers or clients.

Therefore a method as initially referred to is also needed through which one or more of the above mentioned objects can be achieved. Still further a server node is needed through which one or more of the objects referred to above can be achieved.

Therefore an arrangement as initially referred to is provided which comprises load distribution control means adapted to handle at least clients or subscribers using two different categories of identities separately and appropriately distributing them to processing means. Such load distribution control means are adapted to provide a number of load index values, said number considerably exceeding the number of processing means, load index mapping means (LIM), e.g. a table, adapted to provide a mapping between load indices and processing means and said load distribution control means further comprises first mapping means handling clients or subscribers using a first category of identity comprising a, for the node, normal identity, (e.g. generated externally of the arrangement or the server node), said first mapping means comprising a mapping algorithm adapted to establish a load index value ($LI_I$) for incoming messages identifying a client or subscriber with a first category identity, and still further it preferably comprises internal identity generating means for generating identities for incoming messages using at least one other category of identity. It also comprises second mapping means comprising a second mapping algorithm for establish a load index value ($LI_{II}$) for such second category, e.g. internally generated identities. It should however be clear that internal identity generating means may be provided in the arrangement, e.g. in the processing means, in separate means of the arrangement, on separate boards, or as an arrangement (s) in communication with but externally of the arrangement.

The load distribution control means are furthermore adapted to distribute the mapping table to each interface board and to each processing means. A client or a subscriber identified through a first normal identity or a second internally generated identity is handled by the processing means given by the corresponding established load index. Particularly the load index mapping means are adapted to map load indices to processing means according to given criteria.

In a preferred implementation the load index mapping means are adapted to map load indices to processing means such that a substantially even load distribution among the processing means is obtained (also when processing means appear or disappear).

Preferably the number of load indices available for mapping to processing means is much higher than the number of processing means, particularly it comprises substantially $p^2$, or at least $p^2$, p being the number of processing means in the server node. Generally, the higher the number of load indices, the better. Anyhow, the main thing is that the number considerably exceeds P.

Particularly the mapping table is updated, e.g. reestablished or recomputed, when the number of available processing means is changed, e.g. one or more processing means is added and/or removed, e.g. malfunctioning. Particularly, in one embodiment, the first category of identities (normal identities), in e.g. GPRS (GSM Packet Radio Service) comprise subscriber IMSIs (International Mobile Subscriber Identity).

However, it should be clear that normal identity here is taken to mean an identity that is normal for the server node, and unique for a subscriber or client e.g. for SGSNs, MSC, HLR it may be IMSI. For an EIR (Equipment Identity Register) it would be IMEI (International Mobile Equipment Identity) etc. Particularly said second category of identities comprise internally generated identities used when replacing identities in messages from external network elements e.g. GGSNs, SCPs, MSs/UEs, SGSNs, MSCs, RNCs (for GPRS) etc. concerning a specific client or subscriber. Particularly said second category of identities comprise internal identities, particularly internally generated identities replacing TMSI (Temporary Mobile Subscriber Identity), P-TMSI (Packet TMSI), transaction identities etc. and particularly said identity generating means are adapted to generate an internal identity to replace such identities, said internally generated identity subsequently being used in all messaging with (to/from) external network elements. An external network element is here taken to mean any node e.g. a GGSN, an SCP, a MSC, an RNC etc. (for GPRS) or the client or subscriber itself.

In a particular implementation the arrangement is adapted to handle at least a third category of identities in addition to said first and second categories separately and/or differently from said first and second categories of identities. Particularly said third category of identities comprise identities used in spontaneous messages from an external network element not comprising the normal identity of the subscriber or client or occurring with a very low frequency, e.g. client or subscriber hardware specific identities such as IMEI, of course unless IMEI is the normal identity, e.g. if the server node is an EIR as discussed above.

Particularly the arrangement is adapted to send a broadcast to all processing means in order to allocate a processing means or the appropriate processing means to a message, or a subscriber or client identified through an identity of said third category which, as referred to earlier in the application occurred with a very low frequency which makes the procedure of making a broadcast to all the processors a viable strategy.

Preferably first and second mapping means are provided in each interface board, hence increasing robustness and fault-tolerance. In a particular embodiment interface boards and processing means are disposed separately. Alternatively processing means and interface boards are co-located.

In a particular implementation the load distribution control means comprises a centralized object for computing, maintaining and distributing the load index table to all interface boards and to all processing means in the server node.

According to an advantageous implementation of the inventive concept, said identity generating means comprises an identity category specific server for each category of identities received and for which internal identities are to be generated.

Even more particularly each identity specific server means cooperates with or is integrated with a corresponding second mapping algorithm dedicated for a specific category of identities such that mapping can be performed between a generated identity and a load index. The identity generating means or identity specific servers are particularly provided in the processing means. The processing means particularly comprise control processors.

In a particularly advantageous implementation the first mapping algorithm for mapping between a normal identity and a load index comprises a Hash algorithm for example using a Modulo operation. The inventive concept is basically based on the assumption that each subscriber or client only comprises one normal identity which however has to be normal with reference to the server node. For some other node, another identity or identity category/type may be the normal one.

The arrangement according to the inventive concept is according to different embodiments adapted to be provided in an SGSN (Serving GPRS Support Node), a GGSN (Gateway GPRS Support Node), a Web server, an RNC (Radio Network Control node), an MSC (Mobile Switching Center), an HLR (Home Location Register), a node in an IMS (Internet Multimedia Subsystem), an SCP (Service Control Point) etc. or any server node handling many clients or subscribers, at least most of them during more than one transaction such that it gets important to be able to route clients or subscribers to the correct processing means handling that subscriber independently of which identity or category of identity that is used for the subscriber for example depending on over which node it accesses the server node or if it accesses it directly, spontaneously, non-spontaneously etc.

In a particular implementation the arrangement is adapted to transfer a client or a subscriber for which an internal identity has been generated to replace the internal identity, for example P-TMSI, if the arrangement subsequently receives information from the network about the normal identity of the client or subscriber. This is particularly performed through internal signalling between processing arrangements.

Preferably, the arrangement is adapted to, if a client or subscriber has a normal identity, and the arrangement gets knowledge about the normal identity of the subscriber, always generate/find a load index mapped to the normal identity.

The invention also suggests a server node for example in a telecommunication system or a data communication system, such as an SGSN, a GGSN, a CGSN, a HLR, an RNC, an MSC, a Web server, an IMS node etc. which comprises an arrangement as described with reference to one of the embodiments discussed above.

Preferably each interface board comprises a first mapping means, a second mapping means and a LIM table. Further, preferably each processing means comprises internal identity generating means.

The invention also suggests a method as initially referred which comprises the steps of;
establishing whether a message received on an interface board is addressed using a, for the server node, normal, singular or proprietary, identity specific for the subscriber or client, if yes, mapping the normal identity to a load index in a first mapping means using an algorithm, and mapping the load index to a processing means using a mapping table provided in the interface board; if not,
providing or generating an internal identity for a subscriber or client establishing a connection directly or indirectly over an external node over an interface board using another type or category of identity, or if it is a message addressing a client/subscriber using an already internally generated identity;
mapping the internally generated identity to a load index in a second mapping means using an algorithm;
mapping the load index to a processing means using the mapping table provided in the respective interface board.
Advantageously the method comprises the step of;
sending a broadcast message to all processing means in the server node upon reception of a spontaneous message from an external network element e.g. an external node or a subscriber/client with an identity of a category, or type, that is set externally, i.e. not generated internally, and not a normal identity, and occurring with a very low frequency.

Preferably the message further comprises the step of;
computing or establishing a load index-to-processing means mapping table in the server node, for example in a centralized object;
distributing the load-index-to-processing means mapping table to all interface boards and processing means in the server node.

Even more particularly the method comprises the step of;
designating a number of load indices which number considerably exceeds the number p of processing means, preferably exceeding $p^2$. According to one embodiment the normal identity is the subscriber IMSI, and the server node some kind of a GPRS node.

Preferably the method further comprises the step of;
updating, e.g. re-computing, and redistributing, the load-index-to-processing means mapping table when a processing means is added, e.g. appears, or disappears, e.g. is malfunctioning or similar.

The distributing steps particularly comprises;
distributing the load, i.e. the clients or subscribers substantially evenly among the available processing means.

In an alternative implementation the mapping comprises the step of distributing the load according to some given criteria, for example unevenly, among the processing means which hence is done, or how, is determined upon creation of the load index-to-processing means mapping table.

In a particular implementation the first mapping means comprises a mapping algorithm comprising a Hash function e.g. implementing a Modulo operation. Other types of Hash functions, for example more advanced Hash functions may also be used as well as entirely different algorithms.

The method further particularly comprises the step of;
using a reference identity or the internally generated identity or a reference identity for all subsequent communication concerning the client or subscriber in question through which the load index can be deduced or extracted, allowing for routing to the appropriate routing means from external network elements.

BRIEF DESCRIPTION OF THE DRAWINGS

The invention will in the following be further described, in a non-limiting manner, and with reference to the accompanying drawings, in which.

DETAILED DESCRIPTION OF THE INVENTION

Figure 1:
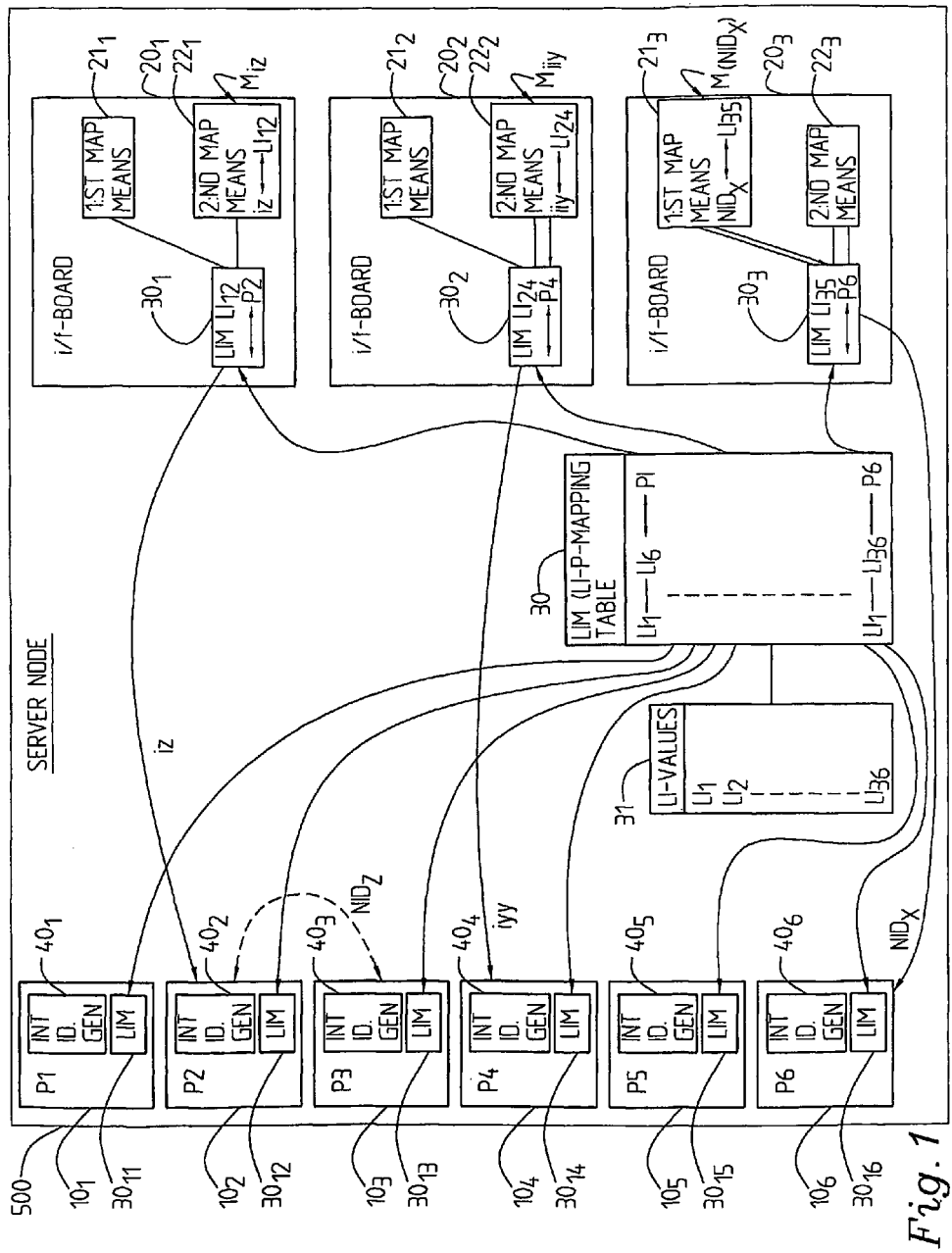
FIG. 1 shows an example of an arrangement according to the invention implemented in a server node.

FIG. 1 shows a server node 500, for example a 3GGP HLR. It should however be clear that it could be any other node as well, as discussed earlier in the application. Here it is supposed that server node 500 comprises a number of processors P1 $10_1$, P2 $10_2$, P3 $10_3$, P4 $10_4$, P5 $10_5$, P6 $10_6$ and a number of interface boards $20_1$, $20_2$, $20_3$. It should be clear that the number of processors, particularly control processors, and the number of interface boards merely are given as an example; generally there are much larger numbers of processors as well as interface boards since the node can handle a very large number of clients or subscribers. It should however be clear that the inventive concept is applicable also when the number of clients or subscribers is lower.

Each interface board $20_1$, $20_2$, $20_3$ can handle messages using many different protocols and generally the way a client or a subscriber is identified is determined by the particular protocol used which also depends on from which node a message is coming or if it comes from the client directly etc. It is supposed that the server node comprises means, here for explanatory reasons illustrated as a list 31, with load index values. Normally the number of load index values shall be much larger than the number of processors involved.

In an advantageous implementation it is the square of the number of processors, in this case it would hence be 36 different load index values since there are 6 processors. In another embodiment, however, the number of load index values that are used is higher than that, but it may also be somewhat lower. The main thing being that it considerably exceeds the number of processors in the server node, normally the more, the better. The node also comprises a load index-to-processor mapping table 30, in the following denoted LIM, in which a mapping is provided between processors and load index values. In this very simple example it is supposed that the first six load indices $LI_1$, ..., $LI_6$ are mapped onto processor P1 etc. and finally load indices $LI_{31}$, ..., $LI_{36}$ are mapped onto processor P6.

It should be clear that this is merely one simple illustration of how the concept can be implemented.

In a preferred implementation LIM is computed in a centralized object in the server node 500. LIM 30 is then distributed to each processor P1-P6 and to each interface board $20_1$, $20_2$, $20_3$. In one implementation replicas of a LIM are provided in the processors and in the interface boards respectively. LIM 30 is most advantageously recomputed and redistributed to the processors and to the interface boards respectively when, and only when, a processor appears or disappears. However, if it is known that a very large number of subscribers or a particular group of subscribers or series of subscribers disappears or appears, LIM may also be recomputed and redistributed etc. Preferably the load indices are evenly distributed over the processors P1-P6. However, particular control means could also be provided to enable any other desired load distribution.

Each interface board $20_1$, $20_2$, $20_3$ comprises first mapping means $21_1$, $21_2$, $21_3$ for mapping messages identifying a client or subscriber by means of an identity that is normal for the server node 500 to a load index. Each interface board also comprises second mapping means $22_1$, $22_2$, $22_3$ for mapping messages identifying a client or subscriber through some other category or type of identification, here particularly through an identity or identity type that has been generated internally in the server node 500 itself. The first and second mapping means in each interface board both communicate with the respective LIM table $30_1$, $30_2$, $30_3$ provided in each interface board as discussed earlier. In the respective load index mapping means $30_1$, $30_2$, $30_3$ respective messages received on the interface board and mapped to a load index in a first or a second mapping means, are through the load index mapped to a processor as given by the LIM 30 from which the information also is provided. Hence, through the respective relevant mapping in LIM $30_1$, $30_2$, $30_3$ a message with a normal identity or some other identity can be mapped to the appropriate processor.

However, each processor here P1-P6 comprises internal identity generating means $40_1$, $40_2$, ..., $40_6$ in which an internal identity can be generated for a message incoming using some other identity than a normal identity, for example a non-spontaneous messages from an external network element regarding a particular client or subscriber handled by the server node during a preceding establishment of a connection between the server node, and the external network element during which procedure the server node, e.g. by means of an internal identity generator in a respective processor provides the external network element with a reference identity, here called an internally generated identity, for the particular client or subscriber and which internal identity then is used in the message to be input to an interface board, as well as for routing of subsequent messages.

In the following some different cases will be in discussed, namely when a message is incoming which is identified through a normal identity, and when a message is incoming being identified through an internally generated identity and the case when a message is incoming which is identified through the same type of identification as an internally generated identity but for which the server node later receives information about the normal identity from the network.

For illustrative purposes simplified examples will be given and described relating to how messages identifying the respective clients in different manners can be handled according to the inventive concept. Hence, it is supposed that a message $M_{(NIDx)}$ is incoming to interface board $20_3$. Since it is a message using a normal identity it is handled in the first mapping means $21_3$. It is here supposed that the normal identity $M_{(NIDx)}$ is mapped to a load index $LI_{35}$. This mapping can be performed through e.g. a simple Hash algorithm e.g. a Modulo operation. Once the load index is found, a mapping to a processor is performed in the LIM $30_3$ also provided in the interface board $20_3$. The content in the LIM replica $30_3$ of course is the same as in LIM 30, but for reasons of clarity the whole LIM table cannot be illustrated in the figure. $LI_{35}$ is here hence mapped to P6 and the message with identity $NID_x$ is routed to P6. The sending of the message can be handled by separate means, by the LIM $30_3$ or by the first mapping means $21_3$; it is merely schematically illustrated in this figure as taking place from LIM $30_3$. Also P6 $10_6$ contains a LIM $30_{16}$ so that it will be aware of which load indices that are handled by itself (and also by the other processing means).

It is supposed that the internal identity generating means $40_6$ provides for extraction of a reference identity containing the load index or through which the load index somehow can be easily extracted, which then is transferred to the external network element such that also for future communication the subscriber here identified by $NID_x$ will be handled by P6 $10_6$.

It is also supposed that a message with an identity which is a so called internally generated identity arrives to another interface board $20_2$. The internal identity is here indicated $M_{iiy}$, wherein iiy is taken to mean a, by the server node 500, internally generated identity. It is supposed that the internal identity has been generated during a preceding handshaking procedure, or during a connection establishment with one of the processing means P1-P6. This procedure will however not be explained with reference to this figure but it is simply supposed that the message is incoming to interface board $20_2$, and since it is a message of a second category of identity, i.e. not a normal identity, it is handled by the second mapping means $22_2$ wherein a mapping algorithm, which particularly is simpler than the one used in the first mapping means, since the identity already was generated internally, maps it to a load index. In this particular case it is supposed that iiy is mapped to load index $LI_{24}$. Since the internal identity was already generated internally in the server node, the load index can easily be identified or extracted out of the internal identity. Using LIM $30_2$ in interface board $20_2$, it can be seen that $LI_{24}$ is handled by P4, and hence the message with the internal identity iiy is sent to P4.

Further it is supposed that an incoming message $M_{iz}$ is received in interface board $20_1$. It is here supposed that the client is not identified by the normal identity but with an identity that is similar to an internal identity, and it will hence be handled in the second mapping means $22_1$ and mapped onto (here) $LI_{12}$ which, using LIM $30_1$ is established to be handled by P2 $10_2$. The message with identity yz is sent to P2. However, yz was not really an identity generated internally in the node but an identity of a similar type, for example a P-TMSI. Later on P2 $10_2$ is made aware of the fact that the client identified through yz actually has a normal identity $NID_z$ and then it is established which load index that identity corresponds to or is mapped to and if it is not the same load index or another load index handled by P2, the message or client is transferred to, in this case, P3 which is the processing means that handles the load index which $NID_z$ is mapped to (which e.g. is established in LIM $30_{12}$ in communication with a first mapping means).

The procedure of providing an internal identity as well as the procedure of allocating such messages and a message with a normal identity will now be explained with reference to FIGS. 2 and 3 according to one embodiment.

As referred to above, according to the present invention it gets possible to distribute clients or subscribers substantially evenly over in a server node available processing means in such a way that incoming messages concerning a particular client can be routed to the processor handling that client without having to maintain an explicit table mapping the identity used in the incoming message to the processor, i.e. all identities to respective processors. The routing adapts to the disappearing and appearing of processors. It should be clear that, when discussing a server node here, the inventive concept is applicable to a large variety or different kinds of server nodes and different systems etc. An example is on 3GPP (Third Generation Partnership Project) nodes, such as BSC, RNC, MSC, SGSN, GGSN, CGSN, HLR, SCP as referred to above, but the concept is of course by no means limited to 3GPP nodes.

Generally the inventive concept is based on the assumption that each client or subscriber has a unique normal identity, NID. The type of the normal identity is actually determined by the type of the server node, which here is expressed as "a for the server node normal identity". In an SGSN, MSC or HLR, the normal identity will typically be the IMSI (International Mobile Subscriber Identity) of a subscriber, whereas in an EIR (Equipment Identity Register) it would be the IMEI associated with the equipment, whereas for other types of nodes it might be the subscriber (MS) ISDN etc. It is further assumed that spontaneous messages from an external network element (NE) regarding a particular client or subscriber either are addressed using the normal identity of the client or the subscriber, or they occur with a very low frequency, i.e. a manual addition of an intercept case, where many different types of identities may be used, for example IMEI or (MS) ISDN etc. depending on server node, which here makes a broadcast to all processors of a viable addressing strategy. It should be clear that this merely relates to specific implementations of the inventive concept and such messages, which are not addressed using the normal identity, or spontaneous, from an external network element and which occur with a very low frequency also can be handled in other manners; the inventive concept not being limited to any specific way for handling such messages, although, in one implementation it is indicated that they can be handled through using broadcast.

Still further another assumption is that non-spontaneous messages from an external network element NE concerning a particular client or subscriber handled by the server node always are preceded by the establishment of a connection between the server node and the network element during which the server node provides the network element with a reference identity for the particular client or subscriber. This reference identity may then be used in all subsequent messaging from the external network element concerning the client or included in an internal identity generated by the server node actually forming the internal identity as discussed above and as also will be discussed more thoroughly below.

According to the invention, and with reference also to FIG. 1, it is supposed that a list or a table or similar 31 is provided designating a range of load indices [0, ..., n, ] or as in FIGS. 1, 1-36. To provide an optimal load balancing also when a processor disappears, n here preferably is in the order of $p^2$, p here being the number of processors in a maximum server node configuration. It should of course be clear that the number of load indices may be somewhat lower as well as somewhat higher or even much higher.

Hence, the load index map (LIM) 30 maps load indices to processors particularly in such a way that the load indices are evenly distributed over the processors. However, also other distribution strategies are possible. As referred to above LIM is preferably maintained and computed by a centralized object in the server node and distributed to each processor, and also to each interface board. A further feature is that LIM is recomputed and redistributed only when a processor appears or disappears (and possibly when an interface board appears or disappears).

Figure 3:
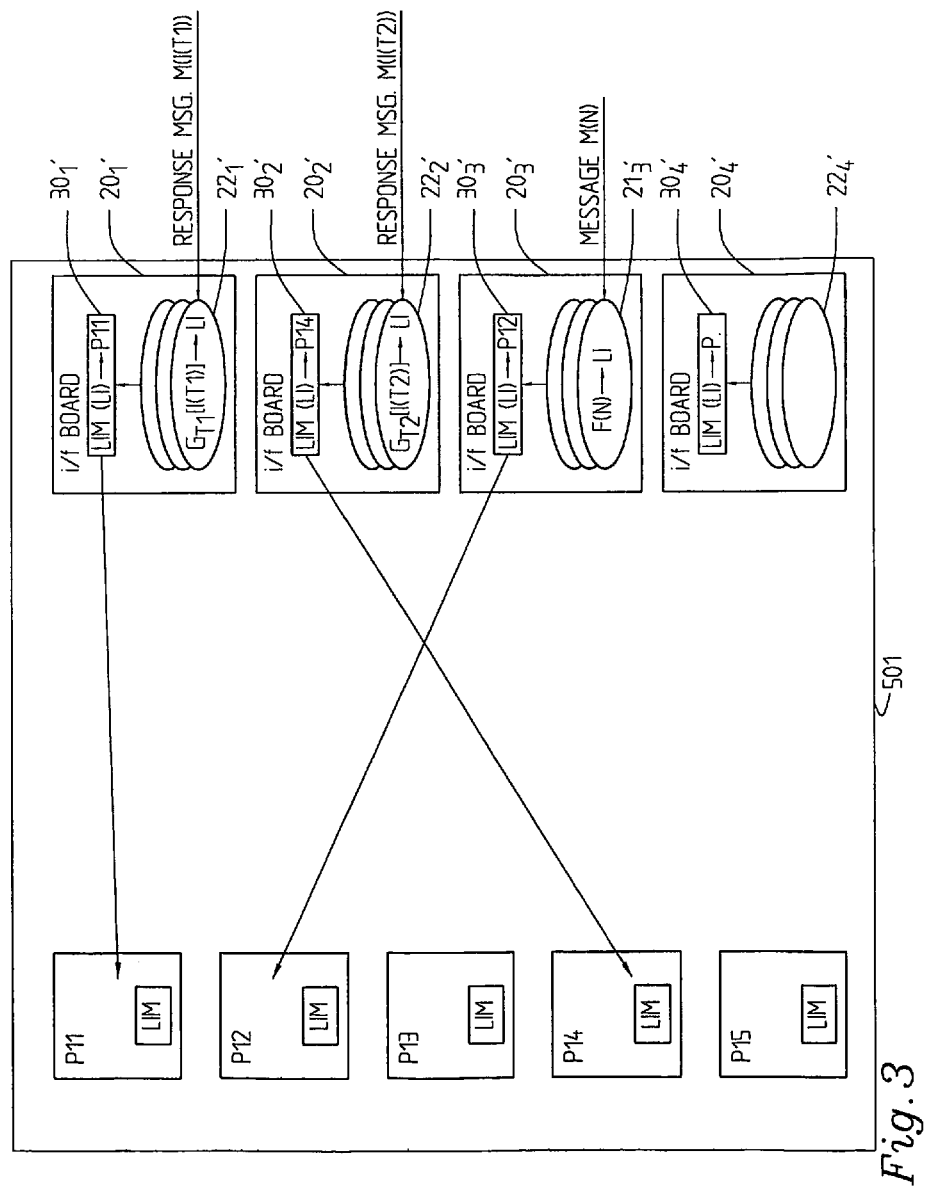

Particularly a designated normal identity mapping algorithm, in FIG. 3 denoted F can be selected as a first mapping means for mapping normal identities to load indices. When given a normal identity, the mapping algorithm F computes a load index. Preferably the mapping algorithm used in the first mapping means is selected in such a way that it with a high probability is capable to distribute any set of normal identities representative for a real population of clients or subscribers, preferably evenly, over the range of load indices. Any type of a simple Hash algorithm may for example be used. In one embodiment $F(N)=(N mod K)$, where K is the number of load indices.

In order to route an incoming message addressed using the normal identity, e.g. NID, to the appropriate processor, F(N) is used to map the NID to a load index, and then LIM is used to map the load index to a processor.

Figure 2:
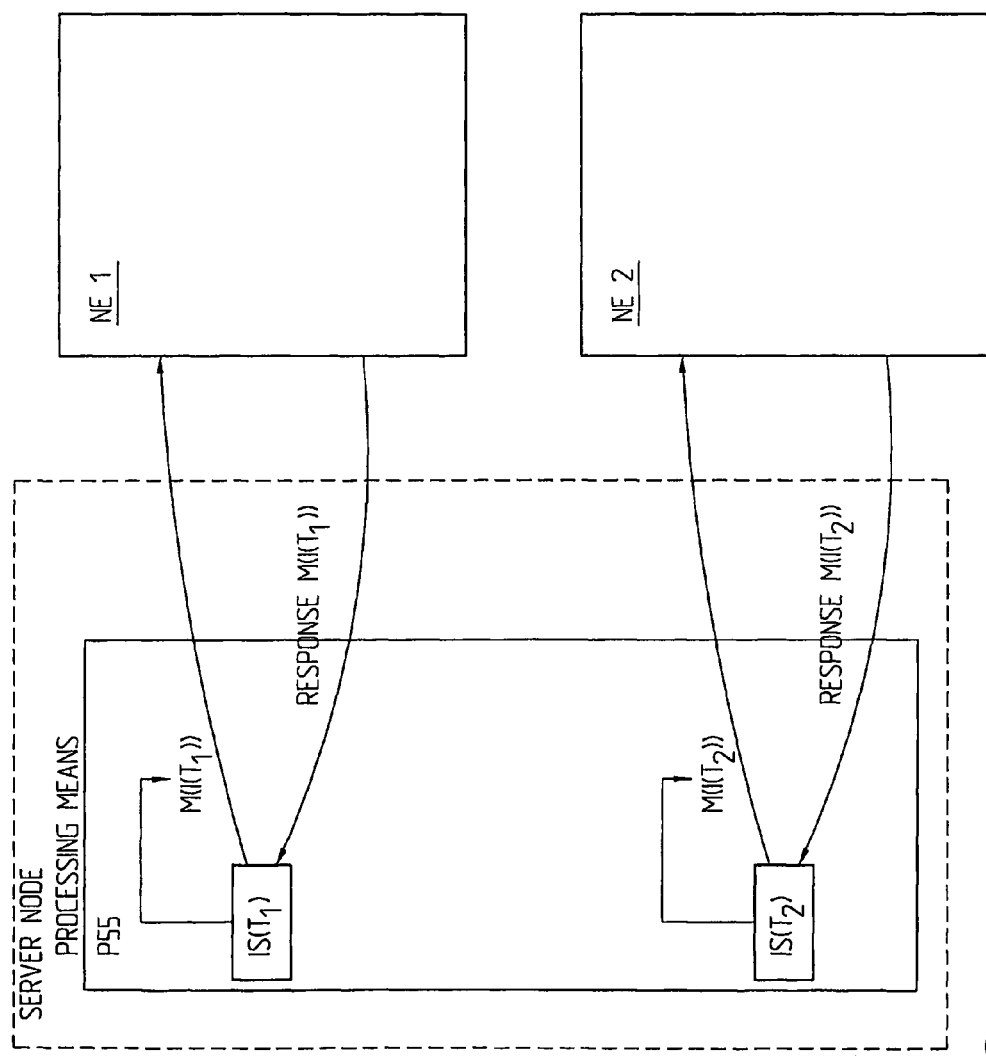
FIG. 2 illustrates generation of internal identities in the server node according to one embodiment of the invention, FIG. 3 schematically illustrates the handling of messages with a normal identity and internally generated identities respectively in the server node.

For each type T of identities that are provided by the server node as client references to external nodes, i.e. for non-spontaneous messages form external network elements concerning a particular subscriber or client as referred to above, in one embodiment cf. FIG. 2, a designated identity server $IS_T$ can be developed together with a T mapping algorithm $G_T$. Hence, for any given load index L, $IS_T$ will generate a unique identity I of type T, i.e. an $I_T$, such that $G_T(I_T)=L$.

Hence, $IS_T$ can be used to generate a reference identity here called $I_T$, for a client or subscriber C with normal identity NID N based on the load index F(N). Hence, $G_T(I_T)=F(N)$.

Thus, $G_T$ may be used for routing incoming messages addressed on identities of types T to the correct processors.

$IS_T$ may for example be realized by explicitly encoding, in each generated identity I, the load index LI, and a unique sequence number S. By maintaining a list of all allocated sequence numbers, a new unique identity may be generated from the next, non-allocated sequence number. Further more $G_T$ is then simply implemented by extracting the explicitly encoded load index.

This procedure is for example illustrated in FIG. 2 in which a message a $M[(IT_1)]$ is generated by identity server $IS(T_1)$ in a processing means P55 in a server node 501, which message is sent to external network element NE 1 which responds with a message $M[I(T_1)]$ containing the identity generated by the identity server.

Correspondingly for a message using an identity of type $T_2$. It should be clear that the identity servers may be implemented in many different ways but particularly in each processing means. They may also be located in a centralized or partly distributed way in the server node.

Hence, FIG. 3 schematically illustrates an example of reception of different types of messages while using a selected first or second mapping algorithm together with LIM to map to the correct processor where the subscriber or client is handled. In this embodiment processors P11-P15 are illustrated. Further a number of interface boards $20_1'$, $20_2'$, $20_3'$, $20_4'$ each handling different types of messages are disclosed. It is supposed that a message with a normal identity, here illustrated as M(N), is incoming on interface board $20_3'$. The message is handled by a first mapping means $21_3'$ comprising a first mapping algorithm F(N) and mapped to a load index LI which in the LIM $30_3'$ table is mapped to processor P12. Hence message M(N) is routed to P12. It is also supposed that a response message M{I(T2)} is incoming on interface board $20_2'$, mapped to a load index LI in second mapping means $22_2'$ using a mapping algorithm for a type T2 messages, $G_{T2}(I(T2))$. Then it is established in LIM $30_2'$ that the particular, found load index is handled by processor P14. Similarly, a response message M{I(T1)} incoming on interface board $20_1'$ is handled in second mapping means $21_2'$ using a mapping algorithm for type T1 and established in LIM $30_1'$ to be handled by a processor P11.

Figure 4:
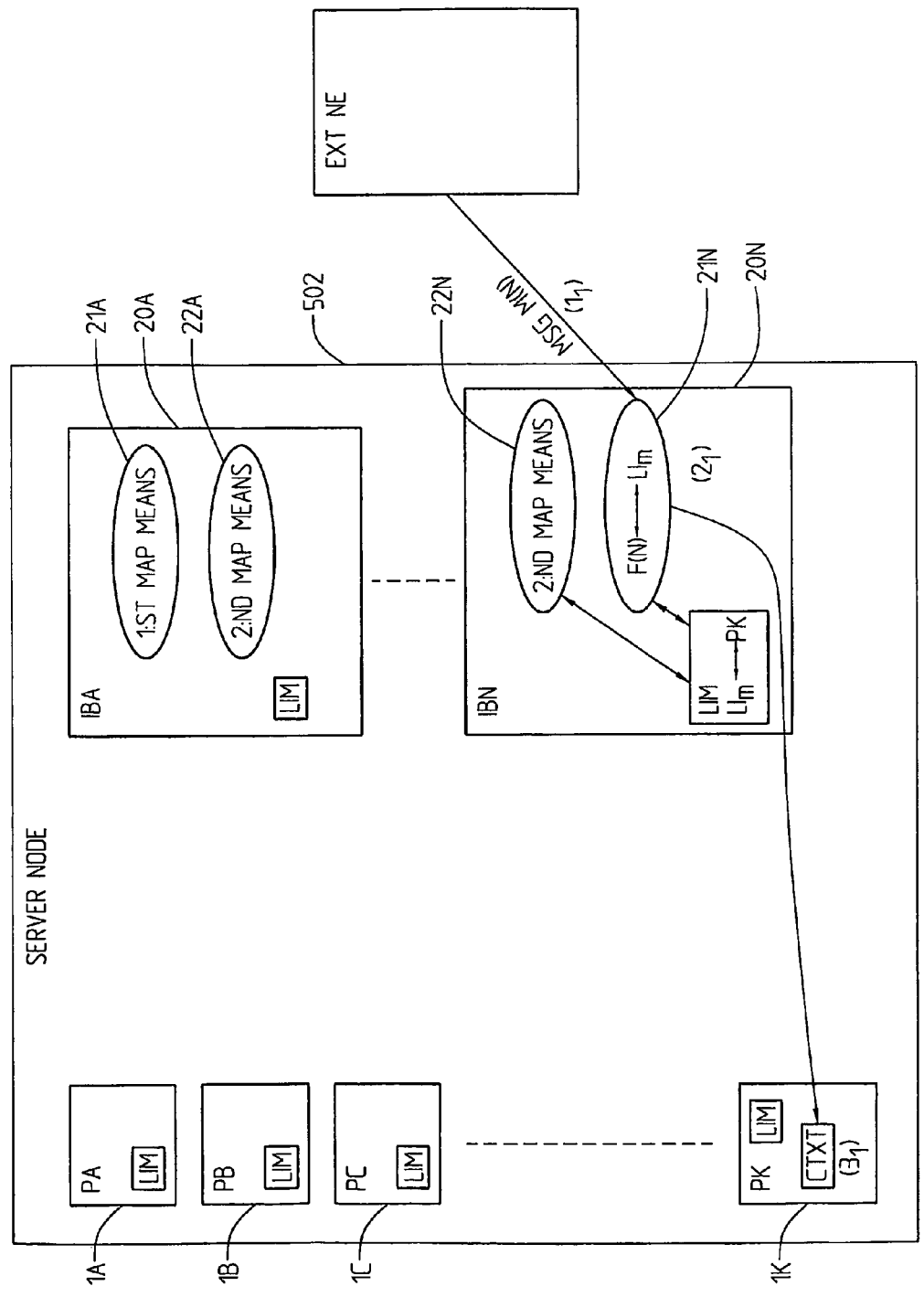
FIG. 4 illustrates a server node handling a message addressed on a normal identity for a known client.

FIG. 4 schematically illustrates a server node 502 comprising a number of processing arrangements, here PA 1A-PK 1K and a number of interface boards IBA 20A-IBN 20N. For reasons of clarity the centrally computed and maintained LIM table is not illustrated in the figure, reference is here made to FIG. 1. However, it is illustrated that replicas thereof or LIM tables are contained in all processing means and in all interface boards. The intention of FIG. 4 is to explain the procedure, when, according to one embodiment, a message MSG M(N) using a normal identity for a client known to the server node 502 is incoming to an arbitrary interface, here IB 20N, ($1_1$). Since M(N) contains a normal identity, it is handled by a first mapping algorithm F(N) in first mapping means 21N, as explained above, which maps the identity to a load index, here $LI_m$, ($2_1$). In communication with the LIM table in IB 20N, it is established that $LI_m$ is handled by PK 1K and, here, the first mapping means 21N sends the message to PK 1K where there already is a context for handling the specific client with normal identity N and hence this context will handle message M ($3_1$).

Figure 5:
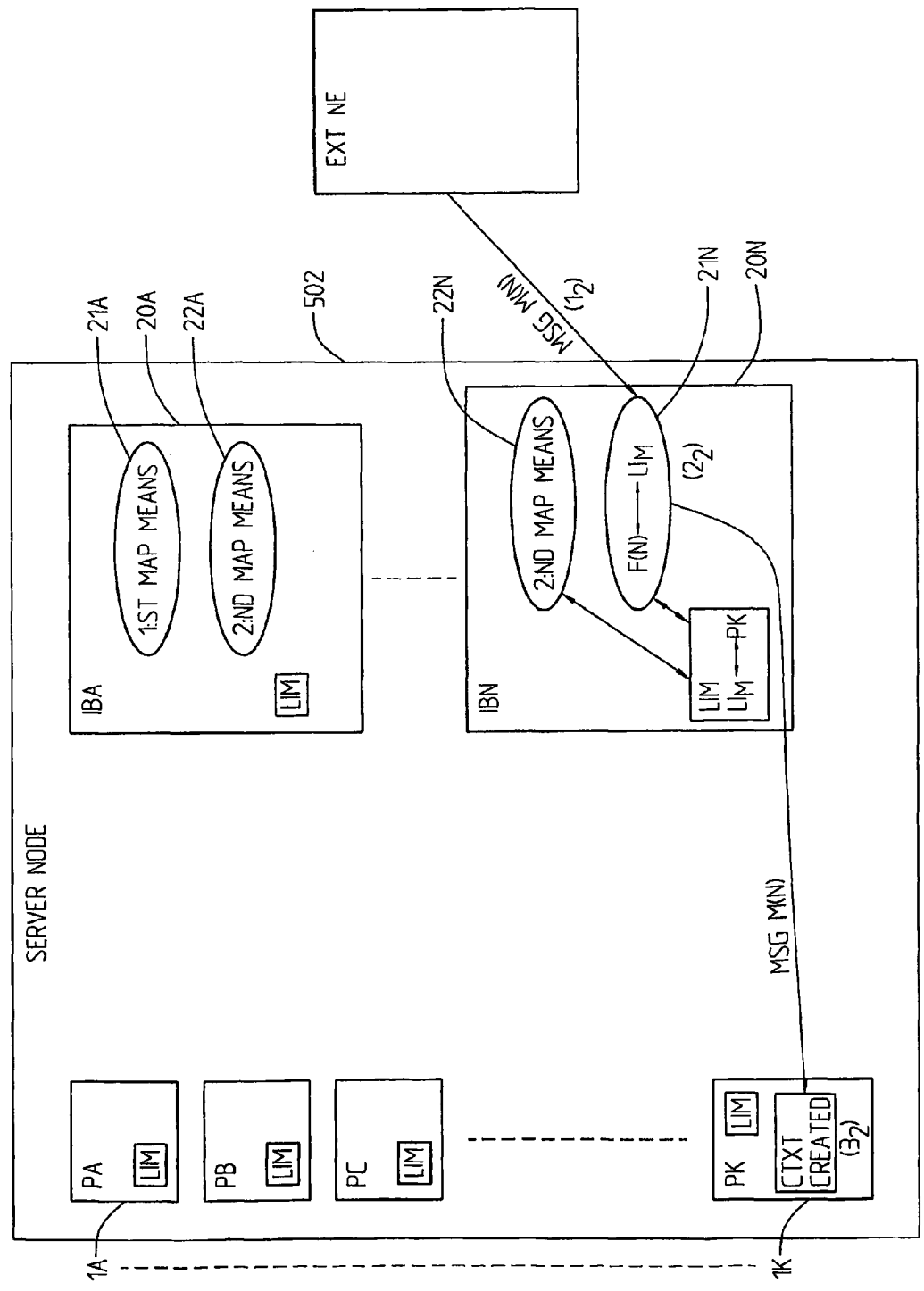
FIG. 5 illustrates a server node handling a message addressed on a normal identity for an unknown client.

FIG. 5 is a figure similar to FIG. 4 for a case when a message M(N) is addressed using a normal identity N, received in an arbitrary interface board, here IB N, for an external network element NE for a client which is not known to the server node 502. In this figure similar reference numerals are used as in FIG. 4. Again the first mapping algorithm F(N) is used to map N to a load index, here found to be $LI_M$. According to LIM, that load index $LI_M$ maps to server processor PK 1K ($2_2$). Therefore the message N is forwarded to processor PK 1K. In processor PK however there is no context for handling the client with NID N and therefore a context is created, ($3_2$). The created context then handles the message M(N).

Figure 6:
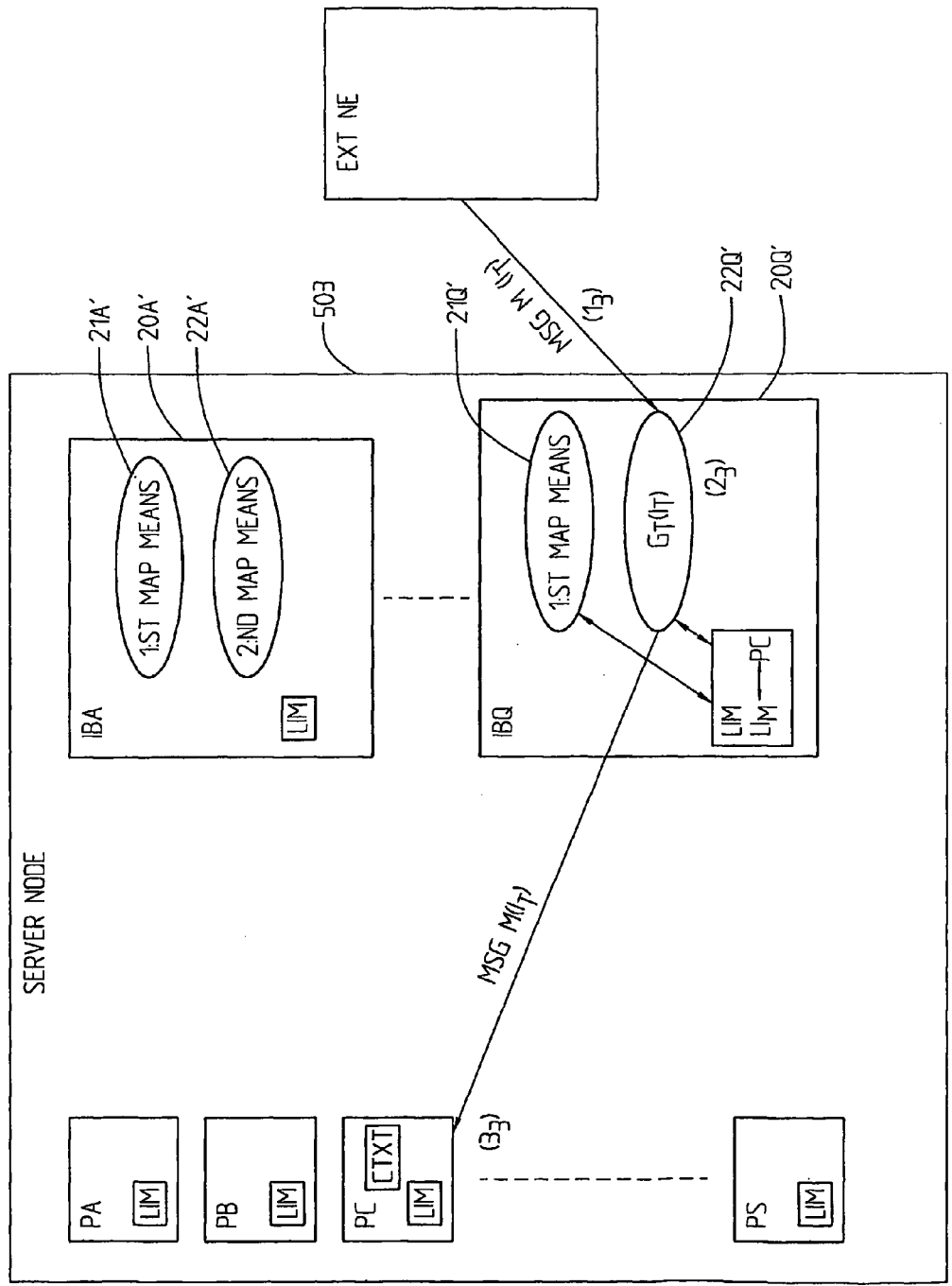
FIG. 6 illustrates a server node handling a message addressed on an internally generated identity for a known client.
Figure 7:
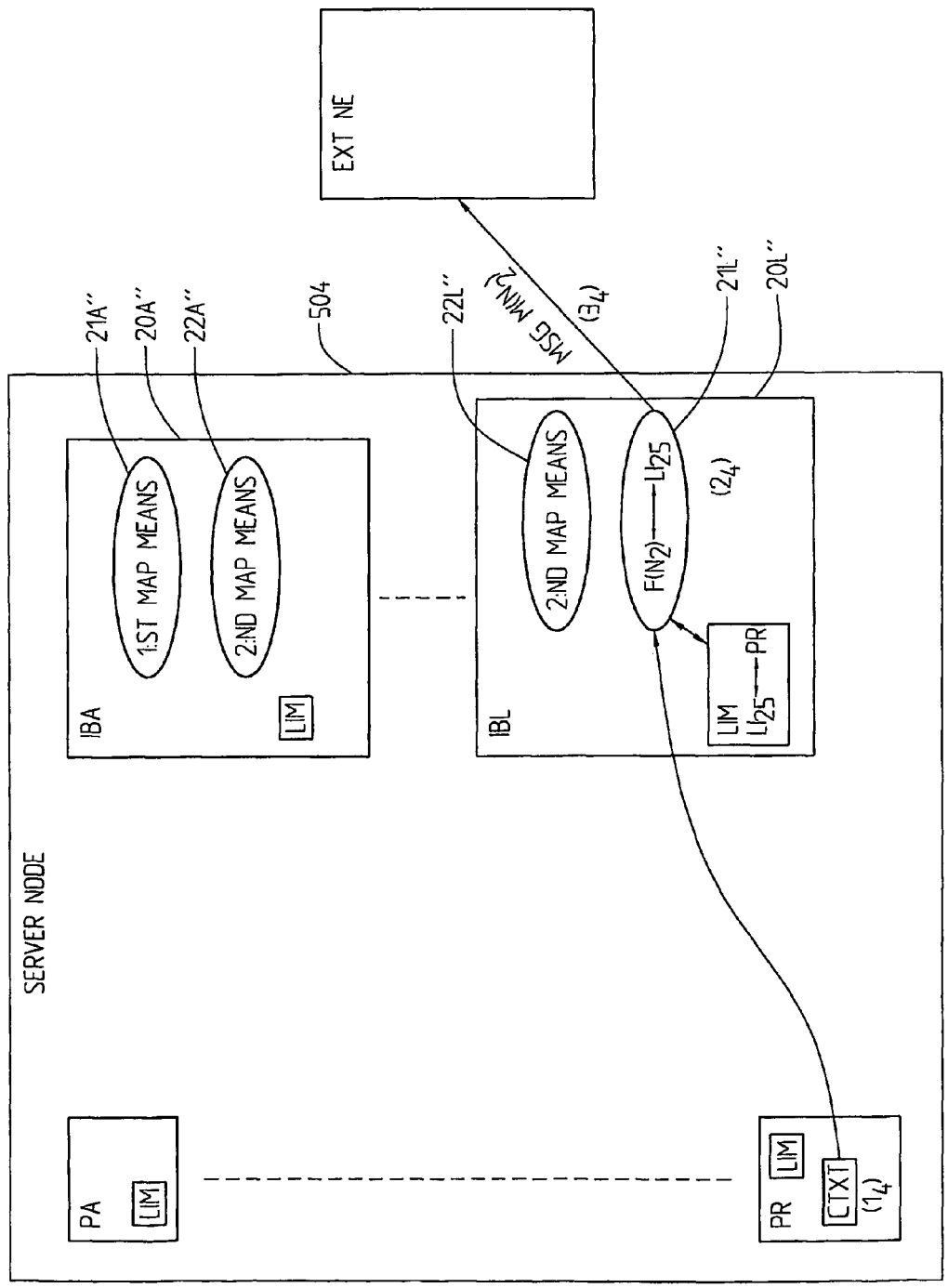
FIG. 7 illustrates the procedure in a server node initiating a dialogue with an external network concerning a specific subscriber.

FIG. 6 is a figure similar to FIGS. 4 and 5 illustrating a server node 503 with a number of processors, particularly control processors (as it can be in any one of the other embodiments as well) PA-PS, each with a LIM, and a number of interface boards, here IBA-IBQ 20A'-20Q' each with first mapping means 21A'-21Q', second mapping means 22A'-22Q' and a LIM. As in FIG. 4 and FIG. 5 the centrally computed LIM is not illustrated in the figure. In the embodiment described with reference to FIG. 6, it is supposed that a message M is addressed using an internal generated identity for a known client. Hence, it is supposed that message M ($I_T$) addressed on $I_T$ is received on an arbitrary interface, here IBQ 20Q' from an external network element, ($1_3$). Since it is of type T, a second mapping means 22Q' with a second mapping algorithm $G_T$ is used to map $I_T$ to a load index, which here for example is supposed to be $LI_{14}$ ($2_3$). According to LIM with which the second mapping means 22Q' communicates, $LI_{14}$ is mapped to the server processor PC. Hence, the message M ($I_T$) is forwarded to PC ($3_3$). In processor PC there is a context for handling the client, since it was known, with identity $I_T$ and that context will handle message M.

FIG. 7 again illustrates a server node 504 and an external network element NE. However, in this case it is supposed that a dialogue is initiated by the server node 504. Here it is supposed that the server node 504 comprises a number of processors PA-PR and a number of interface boards IBA-IBL 20A"-20L". Hence, it is supposed that processor PR initiates a dialogue with the external network NE regarding a certain client, ($1_4$), and an identity $I_T$ is included in the initiating message. $I_T$ is constructed in such a way that subsequent messages from the external NE can be correctly routed to the context of the client in PR. This is achieved by e.g. inserting the load index of F(N) in $I_T$ or by other means encoding F(N) in $I_T$ in such a way that it can be extracted from IT using an algorithm, wherein N is the normal identity of the client. Then the message is handled in the first mapping means 21L", where a mapping performed between the established load index, here for example LI25 and a processor PR having initiated the message that is handled by the first mapping means in for example IBL 21L". The message is then sent to the external network element including identity $N_2$ and the external network element stores $I_T$ so that it can be used as an address in subsequent messages to the server node 504, regarding the particular client.

Figure 8:
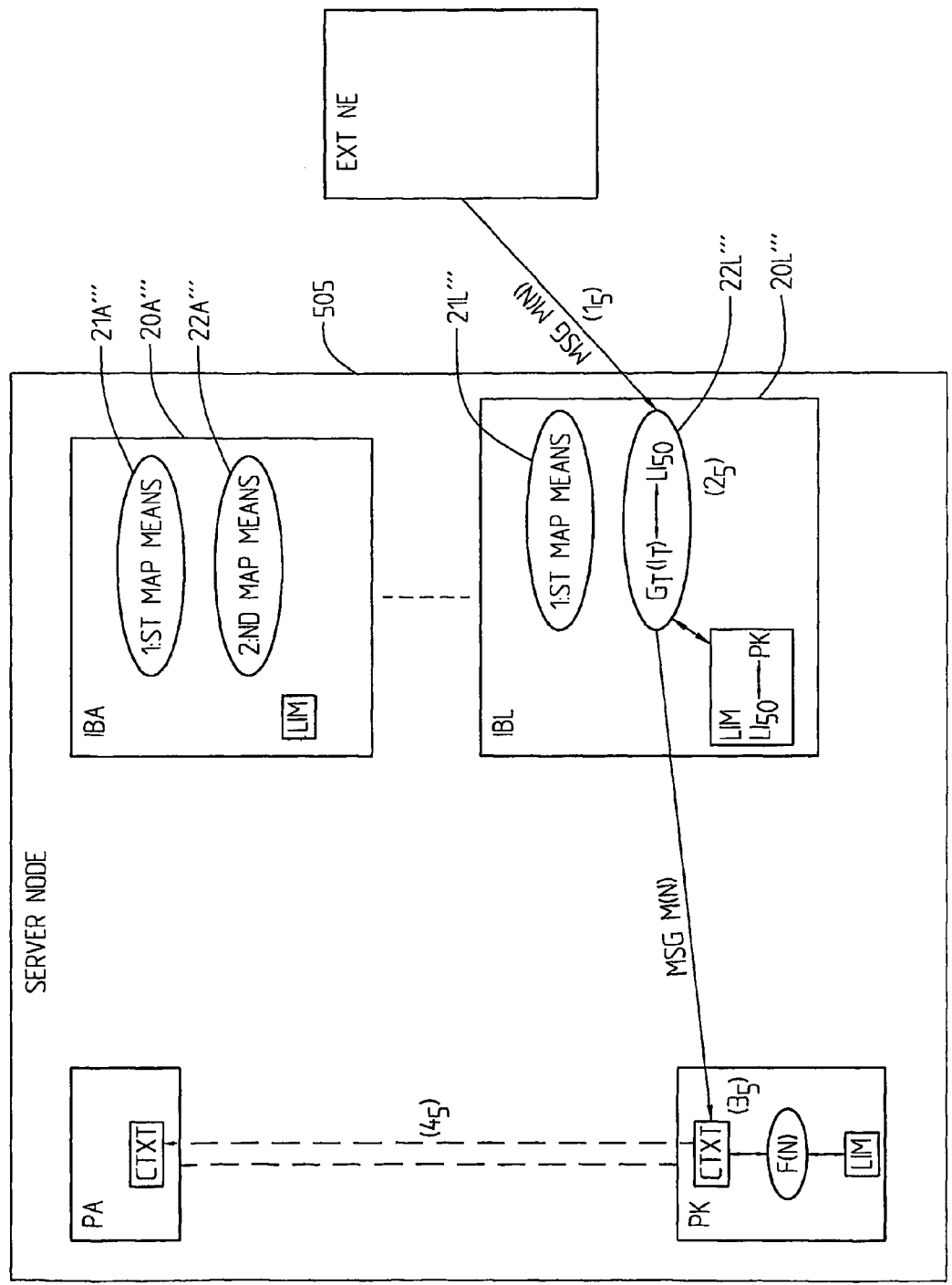
FIG. 8 illustrates an exemplary procedure in a server node when an initiating message is not addressed using a normal identity.

FIG. 8 shows a server node 505 comprising a number of processors P1-PK and a number of interface boards IBA-IBL 20A'''-20L''' and an external network element NE. In this case it is supposed that the initiating message from the external network element is not addressed on NID. Instead a message M ($I_T$) is received on, here, interface board IBL 20L''', ($1_5$). Since it is not addressed using a normal identity, a second mapping means 22L''' comprising an algorithm $G_T$ is used to map $I_T$ to a load index LI, here it is supposed that it is mapped onto $LI_{50}$ ($2_5$), and according to LIM, $LI_{50}$ is mapped to processor PK. The message is then sent to PK but there is no context for handling a client with the identity $I_T$ in PK, therefore a context has to be created which subsequently will handle message M ($3_5$). However, in this case it is supposed that the internal identity actually was not an internally generated identity but just similar to that as to the type, and the client actually has a normal identity, and during the processing of the initiating message the normal identity N of the client is received from the network. If F(N), or the corresponding load index is different from that handled by PK or any of the loading indices handled by PK, the context and the handling of the message is transferred ($4_5$), here, to a context for example in PA, which is established to be the right one.

Figure 9:
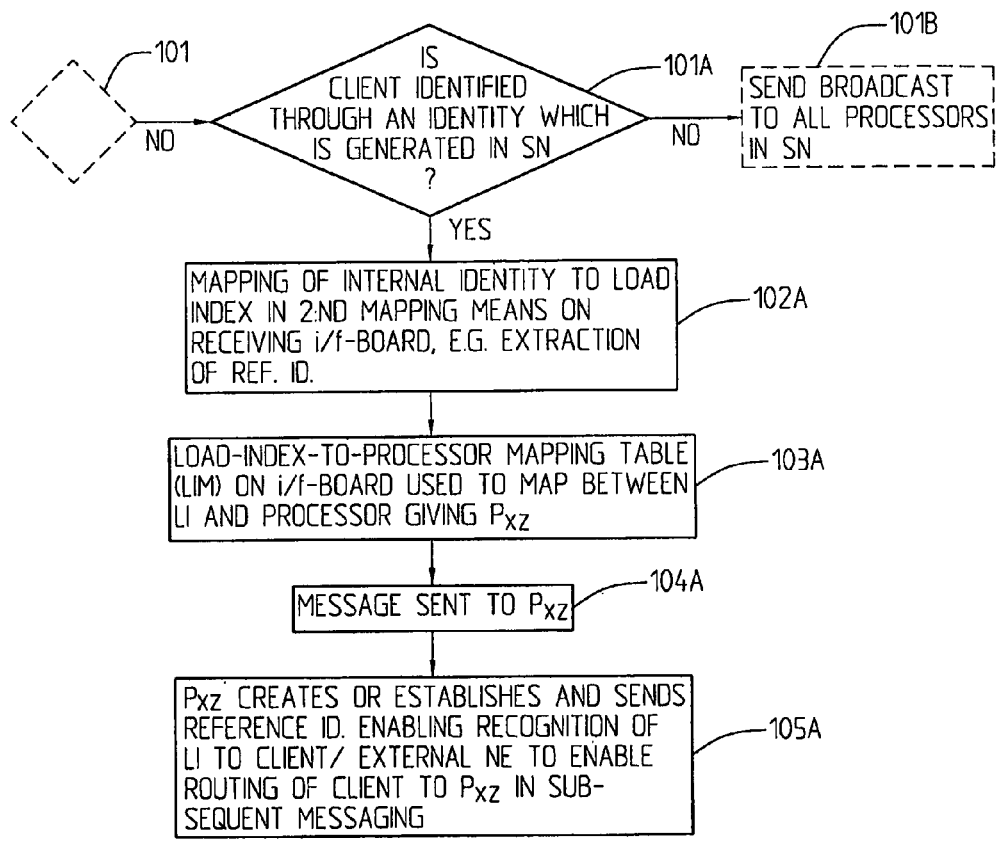
FIGS. 9A and 9B present a flow diagram illustrating an exemplary procedure according to the inventive concept.
Figure 9A:
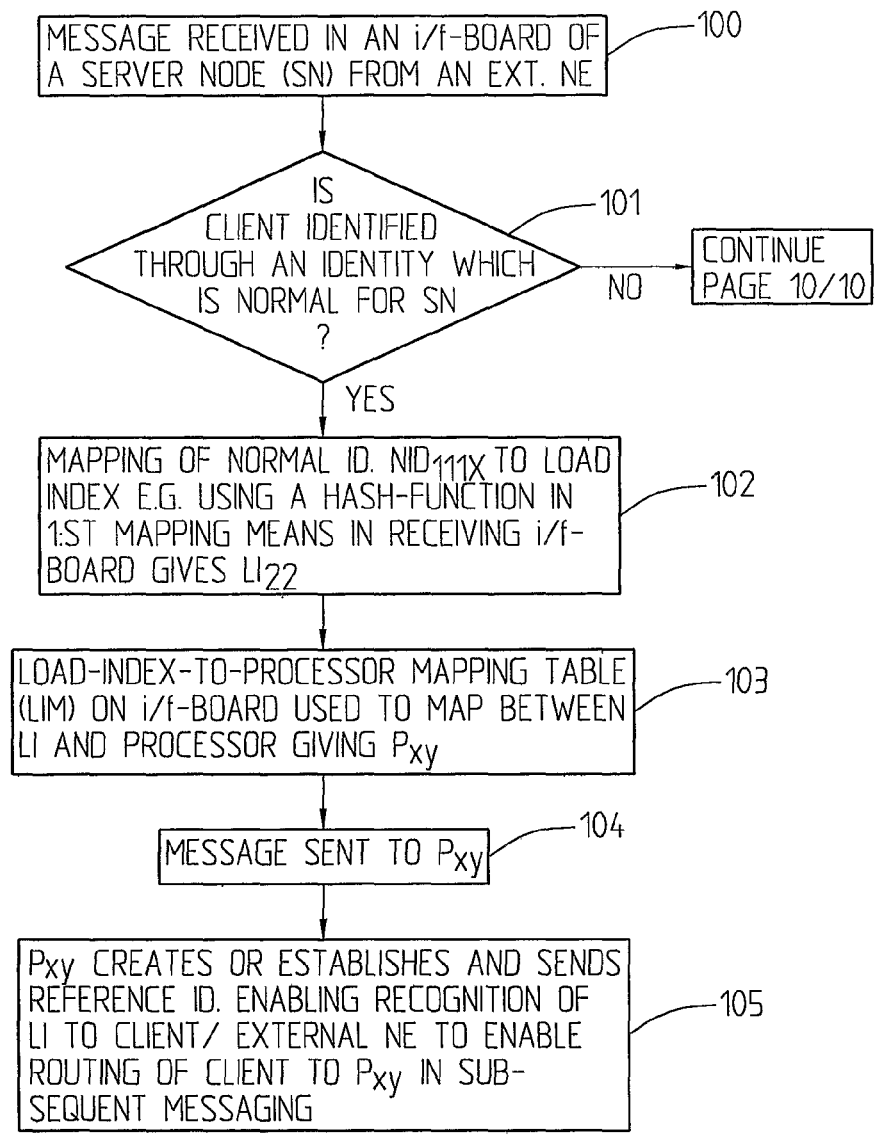
Figure 9B:
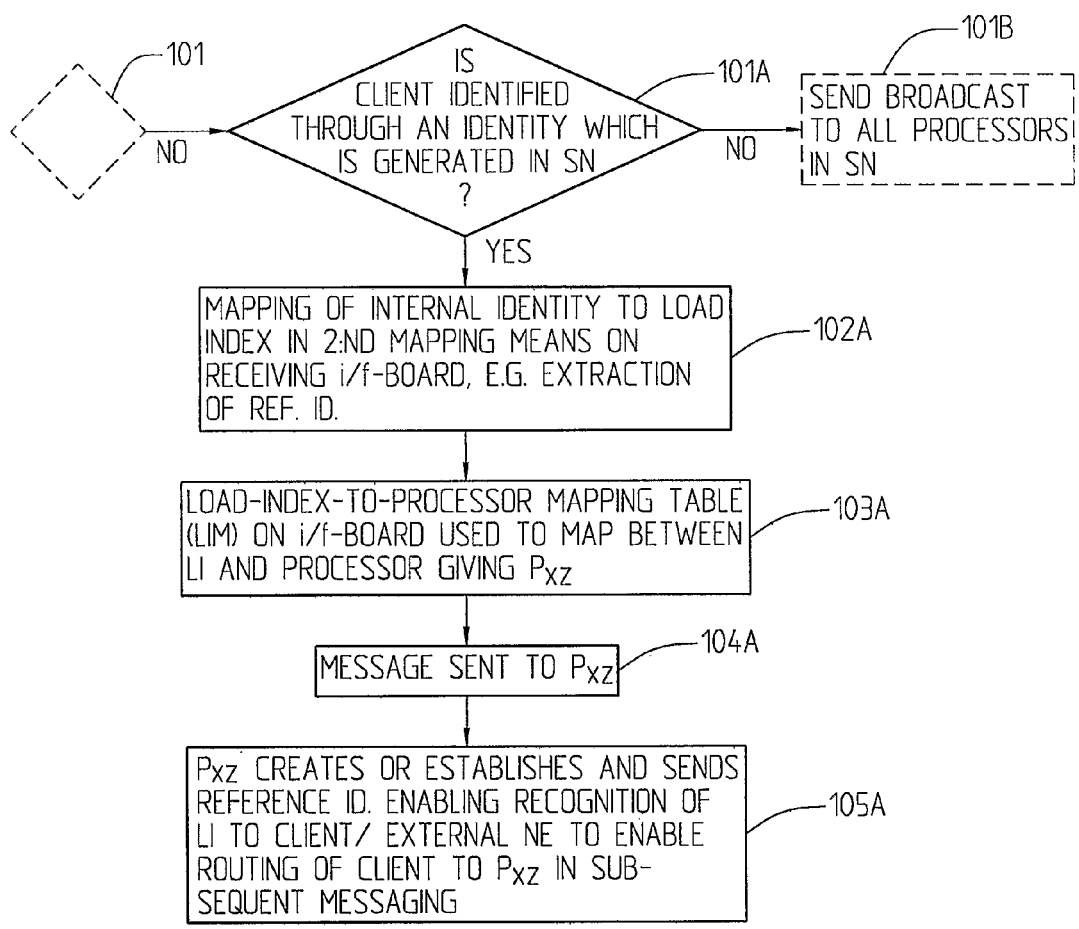

Finally, FIGS. 9A and 9B present a flow diagram illustrating a procedure according to the inventive concept. However, the steps performed when a message is allocated on the "wrong" processor, c.f. FIG. 8, are not included.

Referring to FIG. 9A, it is supposed that a message is received in an interface board of a server node (SN) from an external NE, 100. It is established if the client is identified through an identity which is normal for SN, 101. If yes, the mapping of the normal identity $NID_{111x}$ to a load index is done for example using a Hash function in the first mapping means of the receiving interface board, which mapping here is supposed to give the load index $LI_{22}$, 102. Then the load index-to-processing means mapping table LIM provided on the interface board is used to map between the load index, here $LI_{22}$, and processor, giving processor $P_{xy}$ which hence is the processor handling the load index $LI_{22}$, 103. Subsequently the message is sent to $P_{xy}$, 104, in any appropriate manner, and $P_{xy}$ creates or establishes and sends a reference identity enabling recognition of the load index to the client and/or to the external network element to enable routing of the same client to $P_{xy}$ in subsequent messaging, 105.

Referring to FIG. 9B, if it is established that the client was not identified through an identity which is normal for SN, 101, it is established whether the client is identified through an internal identity; e.g., generated internally in SN, 101A. (It should be clear that the establishment as to whether it is a normal identity or an internal or internally generated identity can be done simultaneously, or in another order, this is merely a schematical example.) If not, according to one implementation a broadcast can be sent to all processors in SN, 101B. If however it was established that the client was identified through an internally generated identity, a mapping of the internally generated identity to load index is performed in the second mapping means in the receiving interface board, for example through extraction of the relevant identity or reference identity, 102A. The load index to processor mapping table LIM on the interface board is used to map between the found LI and processing means, here supposed to give processor $P_{xz}$, 103A. The message is thereafter sent to $P_{xz}$, 104A, and $P_{xz}$ creates or establishes a reference identity enabling the recognition of LI to the client and all the external network elements to enable routing of the client to $P_{xz}$ in subsequent messaging, case 105A. In this case it is easy since the message already was generated based on load index or a reference identity during previous generation for example during a handshake procedure or during establishment of a connection etc.

It should be clear that the invention is not limited to the explicitly illustrated embodiments, but that it can be varied in a number of ways, be implemented in different kinds of systems, telecommunications systems, data communication systems and other systems whenever a server node is handling a large number of subscribers and comprises a number of processors and where an even or some other desired distribution of the load, for example clients or subscribers, is needed, and also when there, at least not as a general rule, is a question about single transactions.

The invention claimed is:

1. A method in a server for controlling the distribution of messages from a plurality of clients among a plurality of processing means in said server, said method comprising the steps of:
    establishing whether a message received on an interface board of said server is addressed using a normal identity specific for the client that sent said message and, if yes, then:
        using a first algorithm to map the normal identity to a load index in a first mapping means; and,
        mapping the load index to one of said plurality of processing means using a mapping table provided in the interface board; and,
    if said message is addressed using an internal identity generated in said server, rather than said normal identity specific for said client that sent said message, then:
        using a second algorithm to map the internal identity to a load index in a second mapping means; and,
        mapping the load index to one of said plurality of processing means using the mapping table provided in the interface board; and,
    sending said message to said one of said plurality of processing means.

2. The method according to claim 1, further comprising the step of using a reference identity based on the load index for the normal identity or the internally generated identity for all subsequent communication concerning the client that sent said message.

3. A server adapted to control the distribution of messages from a plurality of clients among a plurality of processing means in said server, said server comprising:
    means for establishing whether a message received on an interface board of said server is addressed using a normal identity specific for the client that sent said message and, if yes, then:
        using a first algorithm to map the normal identity to a load index in a first mapping means; and,
        mapping the load index to one of said plurality of processing means using a mapping table provided in the interface board; and,
    if said message is addressed using an internal identity generated in said server, rather than said normal identity specific for said client that sent said message, then:
        using a second algorithm to map the internal identity to a load index in a second mapping means; and,
        mapping the load index to one of said plurality of processing means using the mapping table provided in the interface board; and,
    means for sending said message to said one of said plurality of processing means.

4. The server according to claim 1, further comprising means for using a reference identity based on the load index for the normal identity or the internally generated identity for all subsequent communication concerning the client that sent said message.

* * * * *

UNITED STATES PATENT AND TRADEMARK OFFICE
CERTIFICATE OF CORRECTION

| | | |
|---|---|---|
| PATENT NO. | : 8,200,739 B2 | Page 1 of 1 |
| APPLICATION NO. | : 11/993713 | |
| DATED | : June 12, 2012 | |
| INVENTOR(S) | : Bonnier et al. | |

It is certified that error appears in the above-identified patent and that said Letters Patent is hereby corrected as shown below:

On the Face Page, below "ABSTRACT", in Column 2,
delete "4 Claims, 11 Drawing Sheets" and
insert -- 4 Claims, 10 Drawing Sheets --, therefor.

In the Drawings, delete "Sheet 9 of 11".

In Column 2, Line 54, delete "which," and insert -- which --, therefor.

In Column 8, Line 19, delete "node," and insert -- node --, therefor.

In Column 11, Line 16, delete "message a" and insert -- message --, therefor.

In Column 11, Line 16, delete "M[(IT$_1$)]" and insert -- M[I(T$_1$)] --, therefor.

In Column 12, Line 47, delete "IT" and insert -- I$_T$ --, therefor.

Signed and Sealed this
Sixth Day of November, 2012

David J. Kappos
*Director of the United States Patent and Trademark Office*